Patented Sept. 2, 1924.

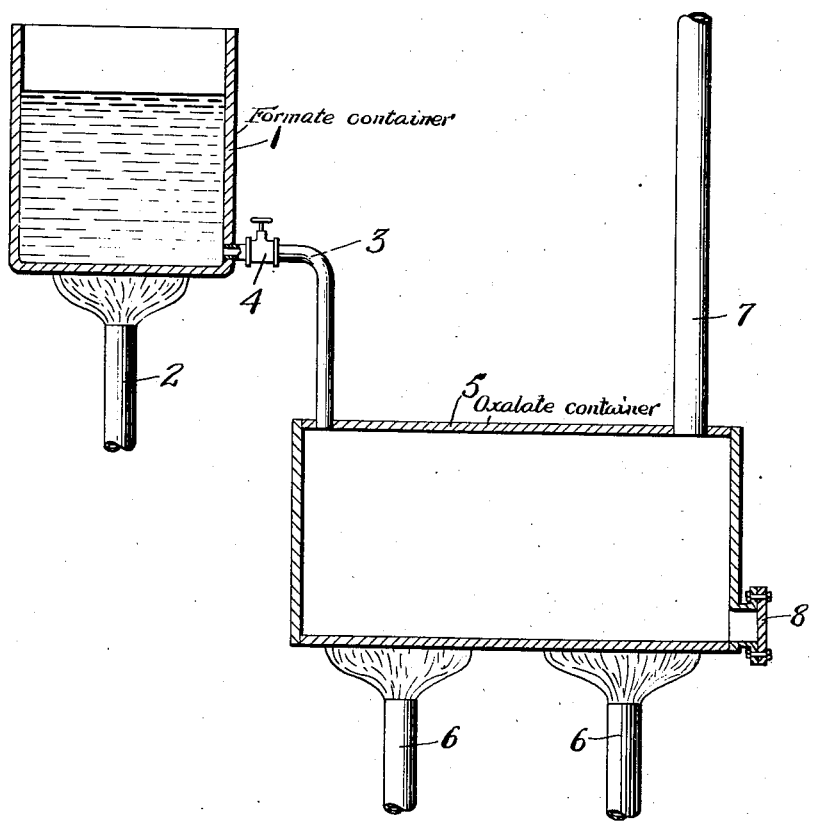

1,506,872

UNITED STATES PATENT OFFICE.

WALTER WALLACE, OF LA SALLE, NEW YORK, ASSIGNOR TO OLDBURY ELECTRO-CHEMICAL COMPANY, OF NIAGARA FALLS, NEW YORK, A CORPORATION OF NEW YORK.

PRODUCING OXALATES FROM FORMATES.

Application filed March 23, 1920. Serial No. 368,122.

*To all whom it may concern:*

Be it known that I, WALTER WALLACE, a citizen of the United States, and resident of La Salle, in the county of Niagara and State of New York, have invented certain new and useful Improvements in Producing Oxalates from Formates, of which the following is a specification.

This invention relates to improvement in producing oxalates of the alkali metals from formates of these metals and has for its object to increase the yield of oxalate without excessive production of carbonate as a by-product.

The common method is to put the solid formate, for example sodium formate, into a heated vessel and bring it as rapidly as possible up to the conversion temperature. It is necessary in order to obtain a good yield of oxalate that the conversion of the formate take place as far as possible at the most favorable temperature. For example, sodium formate when heated decomposes as follows:—

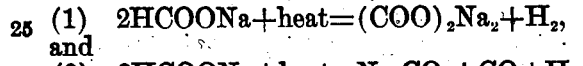
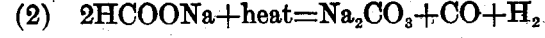

(1) $2HCOONa + heat = (COO)_2Na_2 + H_2$, and
(2) $2HCOONa + heat = Na_2CO_3 + CO + H_2$ the formation of carbonate increasing if the temperature of conversion is too high or too low. The reaction commences at about 295° C., but the best yield of oxalate is when the formate is rapidly brought to from 380° C. to 440° C. While this is readily done with very small quantities of the material, as for instance in a test tube, in the heating of large masses of solid alkaline formate to such temperature, those portions which are first heated by the walls of the vessel are apt to become overheated unless the temperature of the walls of the vessel is kept below 440° C., whereas if the walls of the vessel are kept below such temperature but above 380° C. the sodium oxalate immediately formed on the walls, in the form of a highly non-conducting sponge of solid oxalate and gas, permits only slow heating of the remaining portion of the material, with the result that the conversion of the remainder of the formate takes place at substantially lower temperatures than the most favorable conversion temperature, with the resulting formation of excessive carbonate according to equation (2) above. On the other hand, if such a temperature is maintained on the walls of the vessel that the sodium formate, on its introduction into the vessel, is not rapidly converted in contact with the walls as described above, then the whole mass slowly increases in temperature with the result that the whole conversion takes place at a temperature lower than the most favorable conversion temperature with a resulting excess of carbonate formed. The use of stirring does not overcome these difficulties.

By this invention, the formate is melted in one vessel, below the conversion temperature, then supplied molten to the reaction vessel which is kept heated to maintain the best conversion temperature and there converted in a few minutes, with approximately 90% yield of oxalate and a minimum of carbonate. By this means no heat need be supplied by the walls of the reaction vessel either to raise the temperature of the solid formate to its melting point or to provide the latent heat of fusion to melt the formate, but only sufficient heat to raise the molten formate introduced to between 380° C. and 440° C. Further, the formate being introduced in a liquid condition is heated much more rapidly than when introduced in the form of a solid. Further, the conversion is exothermic, and when this begins in the mass of liquid during its heating in the conversion vessel the rapid and almost simultaneous rise of temperature throughout the entire mass accelerates the attainment of a temperature within the most favorable conversion range and very considerably reduces the period during which conversion is proceeding at temperatures lower than the most favorable range. This is because the exothermic heat is not dissipated during slow conversion of relatively small quantities at a time, but is utilized owing to the sudden release of nearly the entire amount in the mass.

For example, sodium formate is melted, heated to about 270° C., then fed into a conversion vessel previously heated to 440° C. to provide a desired conversion temperature of between 380° C. and 440° C., this giving the most rapid rate of conversion without overheating and the best yield of approximately 90% of sodium oxalate.

A suitable apparatus for carrying out the process is shown in the accompanying drawing wherein 1 represents the premelting vessel heated by burner 2, and connected by pipe 3 having valve 4 to the lower conversion vessel 5 having burners 6 producing the desired conversion temperature, a vent 7, and clean out 8.

While the process above described enables alkaline formate to be converted with maximum yields of oxalate, without the addition of other substances, should it be desired to add caustic alkalis to the sodium formate, as has been recommended by some inventors for the purpose of improving the yield of oxalate, it is necessary that this be added to the molten formate immediately before running it into the conversion vessel, since it is impossible to maintain the formate without decomposition in a molten condition in presence of caustic alkali. In the case of materials to be added other than caustic alkalis, these are also most conveniently added to the formate when it is in a molten condition.

What is claimed is:

1. The process of producing an oxalate from a formate which consists in suddenly heating melted formate from a temperature below that of decomposition to a desired higher temperature for conversion to oxalate by passing the melted formate at the lower temperature into a zone heated to at least the desired higher conversion temperature.

2. The process of producing an oxalate from a formate which consists in suddenly heating melted formate from a temperature below that of decomposition to a desired higher temperature for conversion to oxalate by passing the melted formate at the lower temperature into a zone heated to such higher temperature as is sufficient in conjunction with the exothermic heat of reaction to effect the desired rapid conversion to oxalate.

3. The process of producing an oxalate from a formate which consists in melting a charge of formate in one vessel at a comparatively low temperature, discharging the molten formate charge into a second vessel heated to at least equal temperature, and suddenly raising the temperature of the molten formate charge in the second vessel to effect the desired rapid conversion to oxalate.

4. The process of producing an oxalate from a formate which consists in passing melted formate at a temperature below 290° C. into a vessel heated to a temperature such as to rapidly raise the temperature of the formate to between 380° C. and 440° C.

5. The process of producing an alkali metal oxalate from a formate of the same alkali metal which consists in melting the formate and heating the molten formate, the latter being so treated and heat being so applied thereto as the temperature thereof reaches 270° C., as to cause a sudden rise in the temperature of the entire mass.

6. The process of producing an alkali metal oxalate from a formate of the same alkali metal which consists in melting the formate and heating the molten formate, the latter being so treated and heat being so applied thereto as the temperature thereof reaches 270° C., as to cause a sudden rise in the temperature of the entire mass to between 380° C. and 440° C.

7. The process of producing sodium oxalate from sodium formate which consists in melting the formate and heating the molten formate, the latter being so treated and heat being so applied thereto as the temperature thereof reaches 270° C., as to cause a sudden rise in the temperature of the entire mass and continuing the heating to complete the conversion.

8. The process of producing sodium oxalate from sodium formate which consists in melting the formate and heating the molten formate, the latter being so treated and heat being so applied thereto as the temperature thereof reaches 270° C., as to cause a sudden rise in the temperature of the entire mass to between 380° C. and 440° C.

9. The process of producing an oxalate from a formate which consists in melting the formate, pouring the molten formate upon a more highly heated surface, and applying further heat to the poured formate such as to cause a sudden rise in the temperature thereof to the desired conversion point.

10. The method of producing an alkali metal oxalate, which consists in melting the formate, pouring the molten formate upon a more highly heated surface, and applying such further heat to the poured formate such as to cause a sudden rise in the temperature thereof to the desired conversion point.

11. The method of producing sodium oxalate from sodium formate which consists in melting the formate, heating the molten formate to 270° C., pouring the heated molten formate upon a surface heated to between 380° C. and 440° C., to cause a sudden rise in the temperature thereof to between 380° C. and 440° C. and continuing the heating to complete the conversion.

Signed at Niagara Falls in the county of Niagara and State of New York this 15th day of March A. D. 1920.

WALTER WALLACE.

Certificate of Correction.

It is hereby certified that in Letters Patent No. 1,506,872, granted September 2, 1924, upon the application of Walter Wallace, of La Salle, New York, for an improvement in " Producing Oxalates from Formates," an error appears requiring correction as follows: Page 2, line 84, claim 7, after the word " mass " strike out the words " and continuing the heating to complete the conversion "; and that the said Letters Patent should be read with this correction therein that the same may conform to the record of the case in the Patent Office.

Signed and sealed this 14th day of October, A. D. 1924.

[SEAL.]
KARL FENNING,
*Acting Commissioner of Patents.*